(12) United States Patent
Takeuchi

(10) Patent No.: US 11,161,249 B2
(45) Date of Patent: Nov. 2, 2021

(54) ROBOT CONTROL APPARATUS AND ROBOT SYSTEM

(71) Applicant: Seiko Epson Corporation, Tokyo (JP)

(72) Inventor: Kaoru Takeuchi, Azumino (JP)

(73) Assignee: Seiko Epson Corporation

( * ) Notice: Subject to any disclaimer, the term of this patent is extended or adjusted under 35 U.S.C. 154(b) by 271 days.

(21) Appl. No.: 16/394,384

(22) Filed: Apr. 25, 2019

(65) Prior Publication Data
US 2019/0329415 A1 Oct. 31, 2019

(30) Foreign Application Priority Data
Apr. 26, 2018 (JP) .............................. JP2018-085543

(51) Int. Cl.
*B25J 9/16* (2006.01)
*B25J 13/08* (2006.01)

(52) U.S. Cl.
CPC ........... *B25J 9/1694* (2013.01); *B25J 13/085* (2013.01)

(58) Field of Classification Search
CPC ...... B25J 9/1694; B25J 13/085; B25J 9/1633; G05B 2219/39322; G05B 2219/39323
USPC .................................................. 700/245–264
See application file for complete search history.

(56) References Cited

U.S. PATENT DOCUMENTS

| | | | | |
|---|---|---|---|---|
| 4,621,332 A | * | 11/1986 | Sugimoto | B25J 13/085 318/568.17 |
| 4,906,907 A | * | 3/1990 | Tsuchihashi | B25J 9/06 318/568.16 |
| 5,056,038 A | * | 10/1991 | Kuno | G05B 19/237 700/260 |
| 5,129,044 A | * | 7/1992 | Kashiwagi | B25J 9/1633 700/251 |
| 2011/0093120 A1 | * | 4/2011 | Ando | B25J 9/1638 700/260 |
| 2011/0208355 A1 | * | 8/2011 | Tsusaka | B25J 9/1664 700/246 |
| 2014/0188281 A1 | | 7/2014 | Nagai et al. | |
| 2015/0105907 A1 | * | 4/2015 | Aiso | B25J 9/1697 700/259 |
| 2015/0120055 A1 | * | 4/2015 | Miyazawa | B25J 9/1697 700/259 |
| 2017/0080562 A1 | * | 3/2017 | Tsuzaki | B25J 9/1633 |
| 2018/0032049 A1 | * | 2/2018 | Inazumi | G05B 19/0426 |
| 2018/0188708 A1 | * | 7/2018 | Azuma | G05B 19/404 |

FOREIGN PATENT DOCUMENTS

JP 2014-233814 A 12/2014

* cited by examiner

*Primary Examiner* — Jaime Figueroa
(74) *Attorney, Agent, or Firm* — Harness, Dickey & Pierce, P.L.C.

(57) ABSTRACT

A robot control apparatus includes a processor that is configured to: receive first position information representing a first position in which a first operation including force control to be performed based on magnitude of a force detected by a force detector should be executed; determine an initial value of one of a mass coefficient and a viscosity coefficient that should be used in the force control of the first operation based on specific information on a configuration of a robot stored in a memory unit and the first position information; and store the initial value in the memory.

6 Claims, 10 Drawing Sheets

ROBOT CONTROL APPARATUS AND ROBOT SYSTEM

The present application is based on and claims priority from JP Application Serial Number 2018-085543, filed Apr. 26, 2018, the disclosure of which is hereby incorporated by reference herein in its entirety.

BACKGROUND

1. Technical Field

The present disclosure relates to settings of force control parameters of a robot that performs force control.

2. Related Art

In related art, there is a technique of adjusting force control parameters based on initial values of the force control parameters, operation details input from an operation unit, and feedback values from sensors including a force sensor (JP-A-2014-233814). The initial values of the force control parameters are fixed values independent of operations.

JP-A-2014-233814 is an example of the related art.

However, in the above described technique, it is not easy for beginners to adjust the fixed initial values of the force control parameters independent of operations to values suitable for the specific respective operations by operation of the operation unit. Accordingly, users unskilled in the processing take a lot of trial and error for the adjustment of the force control parameters or are practically unable to make the adjustment of the force control parameters.

SUMMARY

An advantage of some aspects of the present disclosure is to solve at least a part of the above described problem and the present disclosure can be realized as the following embodiments or application examples.

According to an aspect of the present disclosure, a robot control apparatus that controls an operation of a robot having a force detection unit that detects magnitude of an externally applied force is provided. The robot control apparatus includes: a receiving unit that receives first position information representing a first position in which a first operation including force control to be performed based on the magnitude of the force detected by the force detection unit is to be started; and an initial value determination unit that determines an initial value of one of a mass coefficient and a viscosity coefficient to be used in the force control of the first operation based on specific information on a configuration of the robot and the first position information and allows a memory unit to store the value.

DESCRIPTION OF EXEMPLARY EMBODIMENTS

A. First Embodiment

Figure 1:
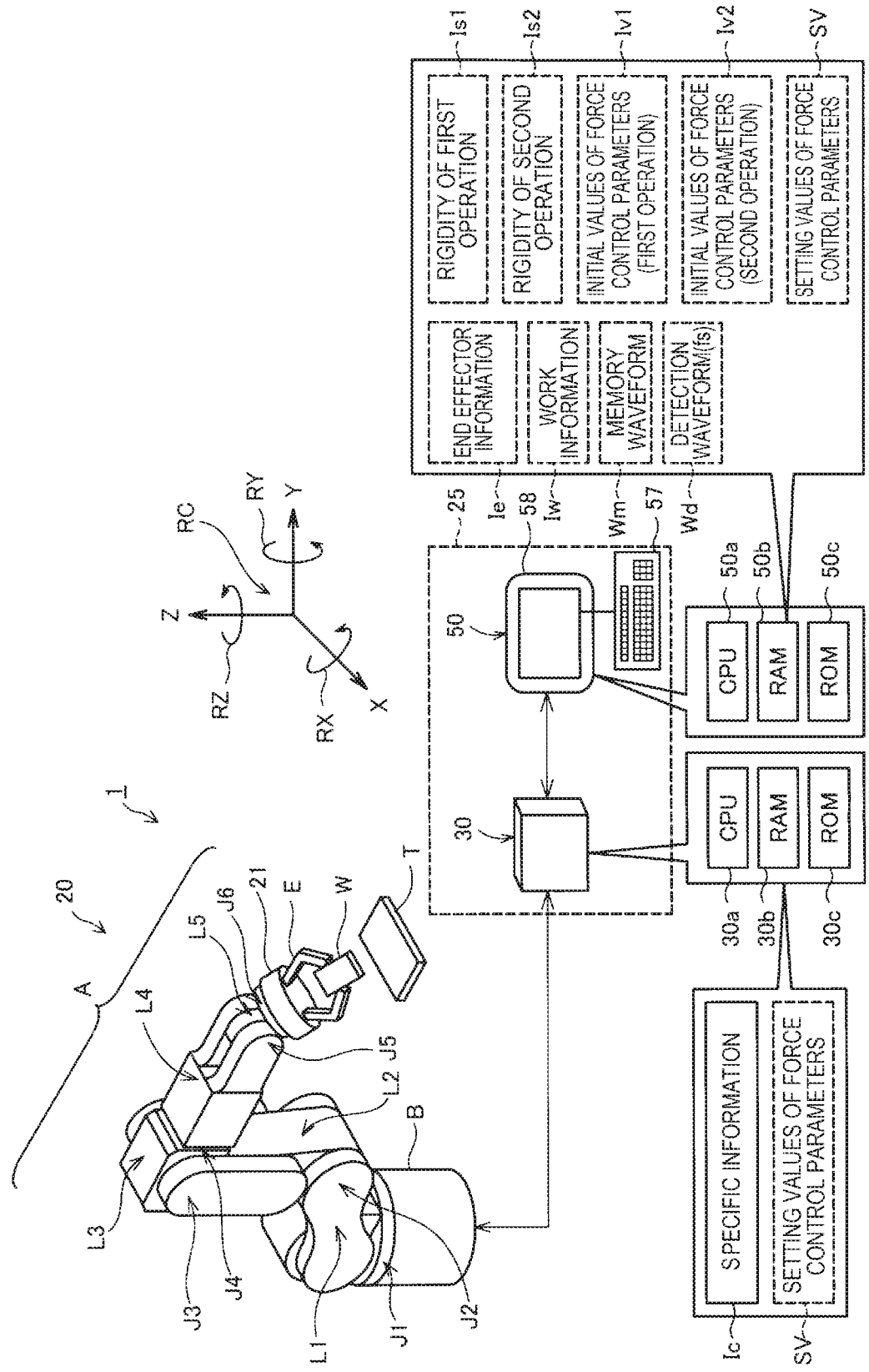
FIG. 1 shows a configuration of a robot system according to an embodiment.

A1. Configuration of Robot System:

FIG. 1 shows the configuration of the robot system 1 according to the embodiment. The robot system 1 includes the robot 20 and a robot control apparatus 25. The robot control apparatus 25 controls the robot 20. The robot control apparatus 25 includes the operation control apparatus 30 and the teaching apparatus 50.

The operation control apparatus 30 controls an arm A of the robot 20 for realizing a target force in a target position set in teaching work by a user. The operation control apparatus 30 includes a CPU (Central Processing Unit) 30$a$ as a processor, a RAM (Random Access Memory) 30$b$, and a ROM (Read-Only Memory) 30$c$. In the operation control apparatus 30, control programs for controlling the robot 20 are installed. In the operation control apparatus 30, these hardware resources and control programs cooperatively operate. The functions of the operation control apparatus 30 will be explained later in detail.

The teaching apparatus 50 teaches a target position St and a target force fst to the operation control apparatus 30. The teaching apparatus 50 includes a CPU 50$a$, a RAM 50$b$, a ROM 50$c$, etc. In the teaching apparatus 50, teaching programs for teaching the target position St and the target force fst to the operation control apparatus 30 are installed. In the teaching apparatus 50, these hardware resources and teaching programs cooperatively operate.

The teaching apparatus 50 further includes an input device 57 and an output device 58. The input device 57 includes e.g. a mouse, keyboard, touch panel, etc. and receives instructions from the user. The output device 58 includes e.g. a display, speaker, etc. and outputs various kinds of information to the user. The functions of the teaching apparatus 50 will be explained later in detail.

The robot 20 is a single-arm robot having the arm A and a support B that supports the arm A. The arm A is a six-axis vertical articulated arm. The arm A includes links L1 to L5 as five arm members and joints J1 to J6 as six joints. The joint J2, joint J3, and joint J5 are bending joints and the joint J1, joint J4, and joint J6 are twisting joints.

The support B and the link L1 are coupled via the joint J1. The link L1 and the link L2 are coupled via the joint J2. The link L2 and the link L3 are coupled via the joint J3. The link L3 and the link L4 are coupled via the joint J4. The link L4 and the link L5 are coupled via the joint J5. The link L5 and a force detection unit (a force detector) 21 and an end effector E are coupled via the joint J6.

The end effector E is attached to the distal end of the arm A via the force detection unit 21. The end effector E is a device for gripping a work W. The position of the end effector E is provided by a TCP (Tool Center Point). In the embodiment, the TCP is on the rotation axis of the joint J6. The operation control apparatus 30 drives the arm A, and thereby, controls the position of the TCP in a robot coordinate system RC.

The force detection unit 21 is a six-axis force sensor that can detect magnitude of an externally applied force. The force detection unit 21 detects magnitude of forces on three detection axes orthogonal to one another and magnitude of torque about those three detection axes.

In the embodiment, with reference to the position of the support B, the coordinate system defining the space in which the robot 20 is installed is expressed by the robot coordinate system RC. The robot coordinate system RC is a three-dimensional coordinate system defined by an X-axis and a Y-axis orthogonal to each other on the horizontal plane and a Z-axis in an upward vertical direction as a positive direction. In this specification, the X-axis in the robot coordinate system RC may be simply referred to as "X-axis". The Y-axis in the robot coordinate system RC may be simply referred to as "Y-axis". The Z-axis in the robot coordinate system RC may be simply referred to as "Z-axis". An arbitrary position in the robot coordinate system RC may be specified by a position DX in the X-axis direction, a position DY in the Y-axis direction, and a position DZ in the Z-axis direction.

In the embodiment, an arbitrary posture in the robot coordinate system RC may be expressed by an angular position RX about the X-axis, an angular position RY about the Y-axis, and an angular position RZ about the Z-axis.

In this specification, the word "position" means not only a position in a narrow sense but also a posture. The word "force" may mean not only a force defined by a direction and magnitude in the three-dimensional space in a narrow sense but also torque acting in the respective rotation directions in the angular position RX, the angular position RY, and the angular position RZ.

The arm A, the force detection unit 21, and the end effector E are communicably connected to the operation control apparatus 30 by cables.

Figure 2:
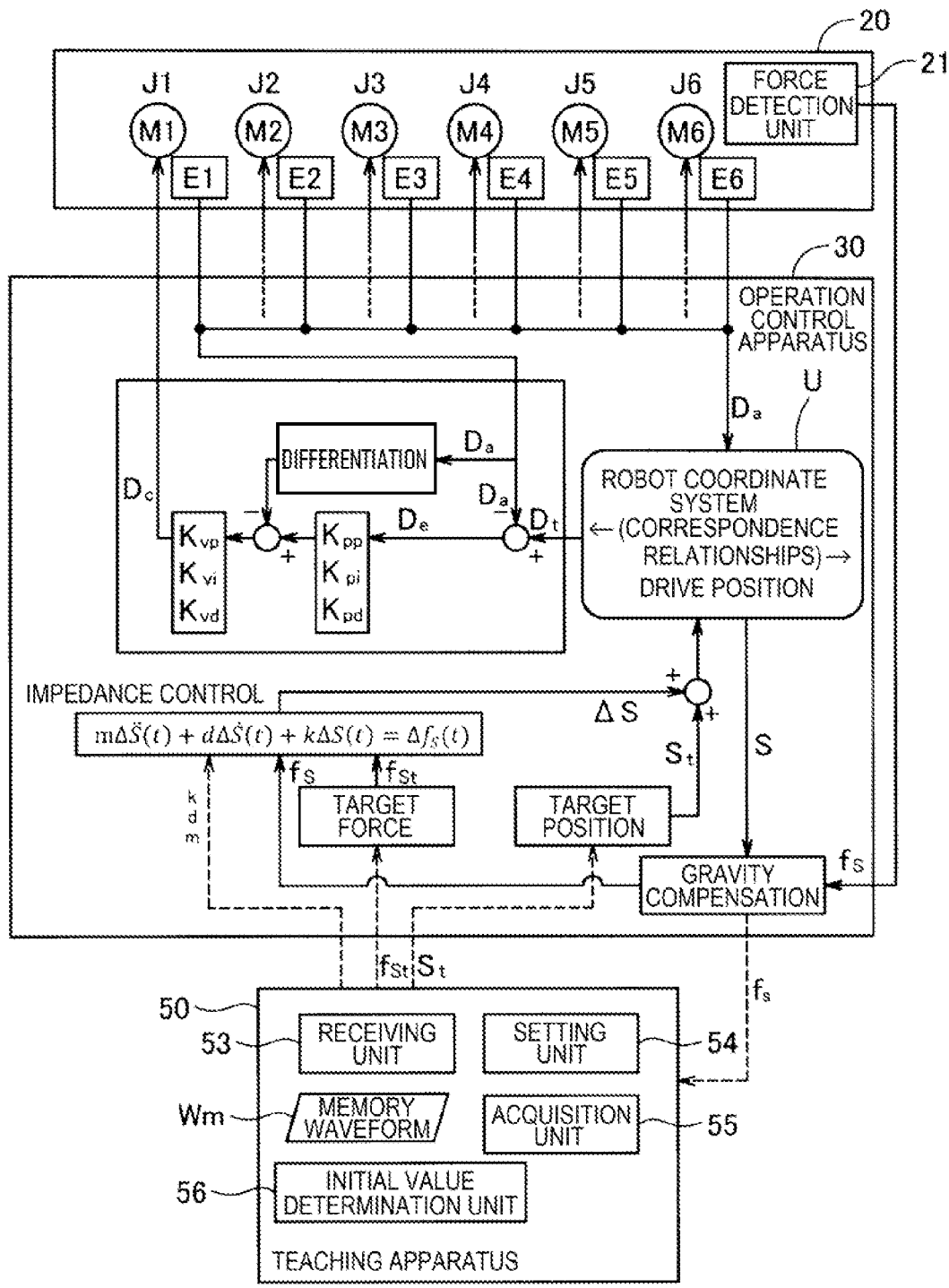
FIG. 2 shows a functional configuration of a robot, an operation control apparatus, and a teaching apparatus.

A2. Operation Control by Operation Control Apparatus 30:

FIG. 2 shows the functional configuration of the robot 20, the operation control apparatus 30, and the teaching apparatus 50. S shown in FIG. 2 indicates one direction of the directions (the X-axis direction, the Y-axis direction, the Z-axis direction, the direction of the angular position RX, the direction of the angular position RY, and the direction of the angular position RZ) of the axes defining the robot coordinate system RC. For example, when the direction indicated by S is the X-axis direction, an X-axis direction component of the target position set in the robot coordinate system RC is referred to as St=Xt, and an X-axis direction component of the target force is referred to as fst=fXt. Further, S also indicates a position along the axis in the direction indicated by S.

The robot 20 includes motors M1 to M6 as drive units and encoder E1 to encoder E6 in the joints J1 to J6, respectively (see the upper part of FIG. 2). The motor M1 and the encoder E1 are provided in the joint 1. The motor M1 drives the joint J1. The encoder E1 detects the drive position of the motor M1. The motors M2 to M6 and the encoders E2 to E6 fulfil the same functions in the joints J2 to J6.

The operation control apparatus 30 stores correspondence relationships U between combinations of the angular positions of the motors M1 to M6 and the positions of the TCP in the robot coordinate system RC within the RAM (see the middle right part of FIG. 2). The operation control apparatus 30 associates and stores the target position St with the target force fst with respect to each step of the work performed by the robot 20 within the RAM. The target position St and the target force fst are set by the teaching work to be described later.

The operation control apparatus 30 acquires rotation angles Da of the motors M1 to M6, and then, converts the rotation angles Da into the position of the TCP in the robot coordinate system RC based on the correspondence relationship U (see the middle right part of FIG. 2). More specifically, the rotation angles Da are converted into a combination of the position DX, the position DY, the position DZ, the angular position RX, the angular position RY, and the angular position RZ.

The force detection unit 21 detects a force fs in a unique coordinate system (see the right upper part of FIG. 2). The relative positions and the relative directions of the force detection unit 21 and the TCP are stored as known data in the RAM 30b of the operation control apparatus 30 (not shown in FIG. 2). Accordingly, the operation control apparatus 30 may specify the force fs in the robot coordinate system RC based on the position S of the TCP and the output of the force detection unit 21.

The operation control apparatus 30 performs gravity compensation on the force fs after conversion into the robot coordinate system RC (see the right lower part of FIG. 2). "Gravity compensation" refers to processing of removing a gravity component from the force fs. The force fs after the gravity compensation shows the other force than the gravity force acting on the end effector E. Hereinafter, the other force than the gravity force acting on the end effector E is also referred to as "acting force".

The operation control apparatus 30 substitutes the target force fst and the acting force fs into an equation of motion of compliant motion control, and thereby, specifies a force-derived correction amount ΔS (see the middle left part of FIG. 2). In the embodiment, impedance control is employed as the compliant motion control. "Impedance control" refers to control to realize virtual mechanical impedance using the motors M1 to M6. The following equation (1) is an equation of motion of impedance control.

$$m\Delta \ddot{S}(t) + d\Delta \dot{S}(t) + k\Delta S(t) = \Delta f_S(t) \quad (1)$$

In the equation (1), m is a mass parameter. The mass parameter is also referred to as "inertial parameter". d is a viscosity parameter. k is an elasticity parameter. The respective parameters m, d, k are obtained from the teaching apparatus 50. The respective parameters m, d, k may be set to different values with respect to each direction or set to common values independent of the directions.

In the equation (1), Δfs(t) is a deviation of the acting force fs relative to the target force fst. t indicates time. The target force fst may be set as a fixed value or set according to a function depending on time in the process performed by the robot 20. The derivative in the equation (1) refers to derivative by time.

The force-derived correction amount ΔS obtained from the equation (1) refers to displacement that should be made by the TCP when the TCP is subjected to the acting force fs by the mechanical impedance, in order to eliminate the force deviation Δfs(t) of the acting force fs from the target force fst and achieve the target force fst. Here, "displacement" is expressed by straight traveling distance and/or rotation angle.

The operation control apparatus 30 adds the force-derived correction amount ΔS to the target position St, and thereby, specifies corrected target position (St+ΔS) in consideration of the impedance control (see the middle right part of FIG. 2).

The operation control apparatus 30 converts the corrected target positions (St+ΔS) with respect to the six directions (the X-axis direction, the Y-axis direction, the Z-axis direction, the direction of the angular position RX, the direction of the angular position RY, and the direction of the angular position RZ) in the robot coordinate system RC into target angles Dt as the target drive positions of the respective motors M1 to M6 (see the middle right part of FIG. 2).

The operation control apparatus 30 executes feedback control to make the rotation angles Da of the motors M1 to M6 shown by the output of the encoders E1 to E6 equal to the target angles Dt as control targets. More specifically, the operation control apparatus 30 executes PID control with respect to positions using deviations De of the rotation angles Da from the target angles Dt, integrals of the deviations De, derivatives of the deviations De. In FIG. 2, proportional gain Kpp, integral gain Kpi, derivative gain Kpd are shown (see the center part of FIG. 2).

The operation control apparatus 30 executes PID control with respect to velocities using output of the PID control with respect to the positions using Kpp, Kpi, Kpd, deviations from the derivatives of the rotation angles Da, integrals of the deviations, and derivatives of the deviations. In FIG. 2, proportional gain Kvp, integral gain Kvi, derivative gain Kvd are shown (see the middle left part of FIG. 2).

As a result of the above described processing, amounts of control Dc for the motors M1 to M6 are determined. The operation control apparatus 30 controls the respective motors M1 to M6 using the amounts of control Dc for the respective motors M1 to M6.

According to the above described processing, the operation control apparatus 30 may control the arm A based on the target position St and the target force fst.

Figure 3:
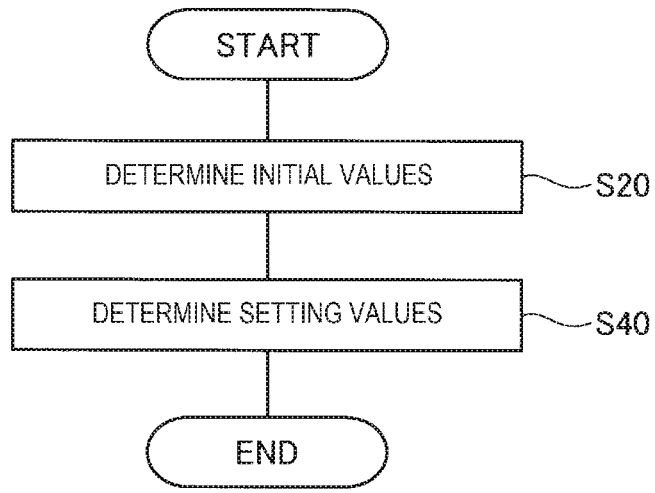
FIG. 3 is a flowchart showing processing of determining parameters of an operation including force control.

A3. Processing in Teaching Apparatus 50:
(1) Determination of Initial Values of Force Control Parameters and Determination of Setting Values:

FIG. 3 is the flowchart showing processing of determining the parameters of the operation including force control. The operation including force control is performed based on the magnitude of the force detected by the force detection unit 21 (see FIG. 1). The parameters of the operation including the force control include the mass parameter m, the viscosity parameter d, and the elasticity parameter k. Hereinafter, the mass parameter m, the viscosity parameter d, and the elasticity parameter k are collectively referred to as "force control parameters".

At step S20, the initial values of the force control parameters are determined using the robot control apparatus 25 (see FIG. 1) according to the position and the posture in which the operation including the force control should be executed and the direction and the magnitude of the force (including torque) that should be generated. Then, at step S40, the robot 20 is moved by the robot control apparatus 25 based on the initial values of the force control parameters, and the setting values of the force control parameters are determined. The processing at step S40 is also referred to as "teaching" for the robot 20. After step S40, the processing ends. Hereinafter, the operation for which the force control parameters are determined by the processing in FIG. 3 is referred to as "object operation".

Figure 4:
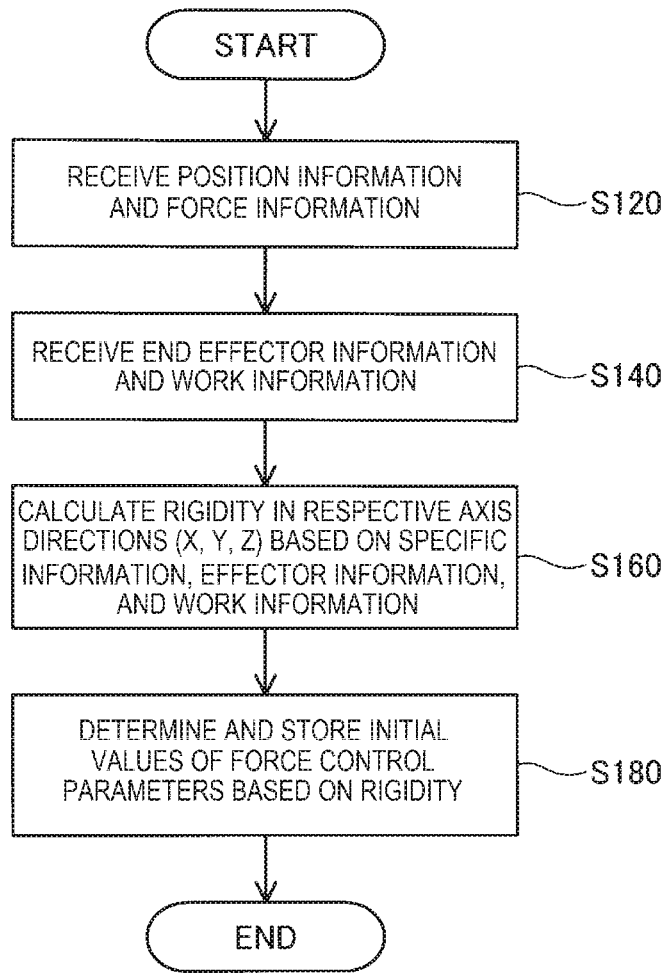
FIG. 4 is a flowchart showing processing of determining initial values of force control parameters.

(2) Determination of Initial Values of Force Control Parameters:

FIG. 4 is the flowchart showing processing of determining the initial values of force control parameters (see S20 in FIG. 3). Specifically, the processing in FIG. 4 is executed by the CPU 50a of the teaching apparatus 50. At step S120, the user inputs position information representing a position of the TCP and a posture of the end effector E in which the object operation should be started to the teaching apparatus 50. "The position and the posture of the end effector E in which the object operation should be started" refers to e.g. a position and a posture of the TCP immediately before the control of the arm A so that a force may act on the force detection unit 21, a position and a posture immediately before machining of another object using the end effector E that grips a machining tool, or the like. Specifically, the position information is a combination of the position in the X-axis direction, the position in the Y-axis direction, the position in the Z-axis direction, the angular position RX of the rotation about the X-axis, the angular position RY of the rotation about the Y-axis, and the angular position RZ of the rotation about the Z-axis in the robot coordinate system RC.

The user inputs force information representing a direction and the magnitude of the target force fst that should be added to the work W when the object operation is executed to the teaching apparatus 50. Specifically, the force information is specified by a combination of a force component in the X-axis direction, a force component in the Y-axis direction, a force component in the Z-axis direction, a torque component in the direction of the angular position RX, a torque component in the direction of the angular position RY, and a torque component in the direction of the angular position RZ in the robot coordinate system RC. Note that the teaching apparatus 50 is adapted so that, at step S120 of the embodiment, one direction of the above described six directions may be selectively input as the direction of the target force fst. Further, the teaching apparatus 50 is adapted so that an arbitrary numeric value may be input as the magnitude of the target force fst. The magnitude of the target force fst may take a positive value or negative value.

The specific values of the position information and the force information are values uniquely determined based on the object operation. Accordingly, these values can be input even by a user unskilled in the setting of the force control parameters. These values are input to the teaching apparatus 50 via the input device 57 (see FIG. 1). The input position information and force information are associated with information that enables identification of the object operation and stored in the RAM 50b by a receiving unit 53. At step S120, the functional unit of the teaching apparatus 50 that receives the position information and the force information is shown as "receiving unit 53" in FIG. 2.

At step S140 in FIG. 4, the user inputs information of the end effector E and information of the work W to the teaching apparatus 50. The information of the end effector E includes (i) information of the weight of the end effector E and (ii) information of a relative position relationship between the position of the distal end of the arm A and the center of gravity position of the end effector E attached to the arm A. The information is referred to as "end effector information".

The information of the work W includes (i) information of the weight of the work W, (ii) information of a relative position relationship between the center of gravity position of the work W when the work W is gripped by the end effector E in the object operation and the center of gravity position of the end effector E, and (iii) information of a relative position relationship between a position of a contact point of the end effector E and the work W when the work W is gripped by the end effector E in the object operation and the center of gravity position of the end effector E. The information is referred to as "work information".

The end effector information and the work information are associated with the information for identification of the object operation and stored in the RAM $50b$ of the teaching apparatus 50. The end effector information within the RAM $50b$ is shown by "end effector information Ie" in FIG. 1. The work information within the RAM $50b$ is shown by "work information Iw" in FIG. 1.

The specific values of the end effector information and the work information are also determined based on the object operation. Accordingly, these values can be input even by a user unskilled in the settings of the operation parameters of the force control. These values are input to the teaching apparatus 50 via the input device 57. At step S140, the functional unit of the teaching apparatus 50 that receives the information of the end effector E and the information of the work W is the receiving unit 53.

At step S160 in FIG. 4, the teaching apparatus 50 acquires specific information Ic on the hardware configuration of the robot 20 from the RAM $30b$ of the operation control apparatus 30 (see FIG. 1). Specifically, the specific information Ic of the robot 20 includes (i) lengths between the adjacent joints (i.e., lengths of the link L1 to link L5), (ii) weights of the link L1 to link L5, and (iii) rigidity of the joints J1 to J6. Note that "rigidity of joint" refers to a value indicating, when the rotation angle of the joint is set to a certain value and a rotational force around the joint is externally subjected, the degree of the shift of the rotation angle of the joint. These values are specific values for the robot 20. These values are stored in the RAM $30b$ of the operation control apparatus 30 in advance. At step S160, the functional unit of the teaching apparatus 50 that acquires the specific information Ic of the robot 20 is shown by "acquisition unit 55" in FIG. 2.

The teaching apparatus 50 obtains rigidity with respect to the X-axis direction, the Y-axis direction, and the Z-axis direction at the contact point between the end effector E and the work W when the TCP is in the position represented by the position information based on the position information (see S120), the end effector information and the work information (see S140), and the specific information Ic. The rigidity in the X-axis direction at the contact point refers to a value indicating the degree of the shift of the contact point when the robot 20 is subjected to the force along the X-axis direction at the contact point. The rigidity in the Y-axis direction and the rigidity in the Z-axis direction have the same concept with respect to the Y-axis direction and the Z-axis direction.

The teaching apparatus 50 obtains the rigidity with respect to the X-axis direction, the Y-axis direction, and the Z-axis direction at the contact point with reference to the correspondence relationships U between the combinations of the angular positions of the motors M1 to M6 and the positions of the TCP in the robot coordinate system RC stored in the RAM $30b$ of the operation control apparatus 30 (see FIG. 2) in addition to the above described respective information.

At step S180, the teaching apparatus 50 calculates rigidity of the robot 20 with respect to the direction in which the force is applied at the contact point based on the rigidity with respect to the X-axis direction, the Y-axis direction, and the Z-axis direction and the information of the direction of the force contained in the force information (see S120). The rigidity with respect to the direction in which the force is applied is associated with the information for identification of the object operation and stored in the RAM $50b$ of the teaching apparatus 50. The information of the rigidity of the robot 20 with respect to the direction in which the force is applied at the contact point stored in the RAM $50b$ is shown by "rigidity Is1 of first operation" in FIG. 1.

The teaching apparatus 50 determines the initial values of the mass parameter m, the viscosity parameter d, and the elasticity parameter k with respect to the direction in which the force is applied in the object operation based on the rigidity with respect to the direction in which the force is applied at the contact point and the magnitude of the force applied in the object operation. Note that, in the embodiment, the initial value of the elasticity parameter k is set to a fixed value.

The teaching apparatus 50 associates the initial values of the mass parameter m, the viscosity parameter d, and the elasticity parameter k with respect to the object operation with the information for identification of the object operation and stores the values in the RAM $50b$ of the teaching apparatus 50. The initial values of the mass parameter m, the viscosity parameter d, and the elasticity parameter k stored within the RAM $50b$ are shown by "initial values Iv1 of force control parameters" in FIG. 1. At steps S160, S180, the functional unit of the teaching apparatus 50 that determines the initial values of the mass parameter m, the viscosity parameter d, and the elasticity parameter k and stores the values in the RAM $50b$ is shown by "initial value determination unit 56" in FIG. 2. After step S180, the processing ends.

Figure 5:
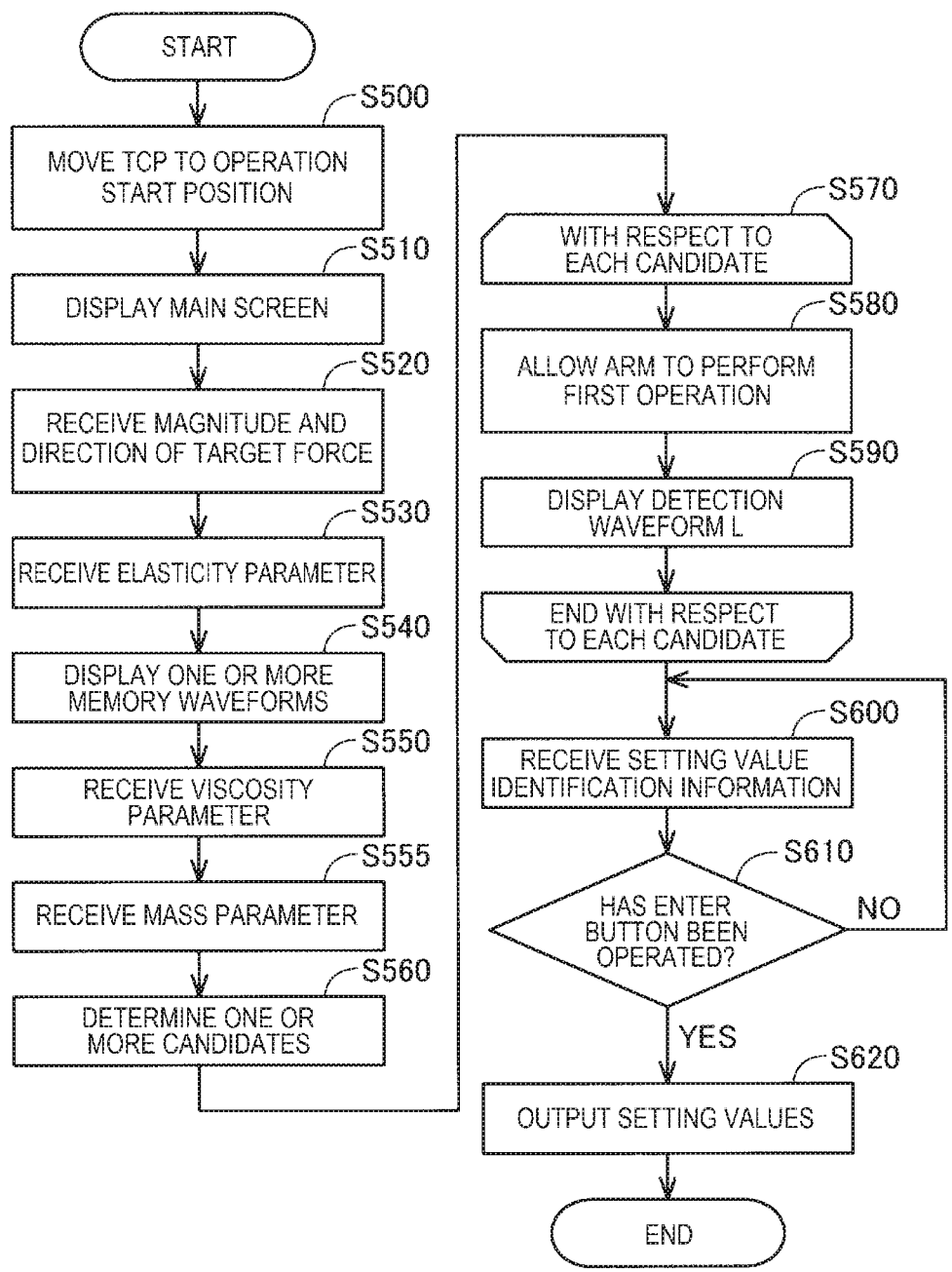
FIG. 5 is a flowchart showing processing of determining setting values of the force control parameters.

(3) Determination of Setting Values of Force Control Parameters:

FIG. 5 is the flowchart showing processing of determining the setting values of force control parameters (see S40 in FIG. 3). At step S500, the teaching apparatus moves the TCP to the start position of the object operation including the force control. The start position of the object operation is input prior to the processing of determining the force control parameters in FIG. 5.

At step S510, the teaching apparatus 50 displays a main screen as a GUI (Graphical User Interface) on the output device 58.

Figure 6:
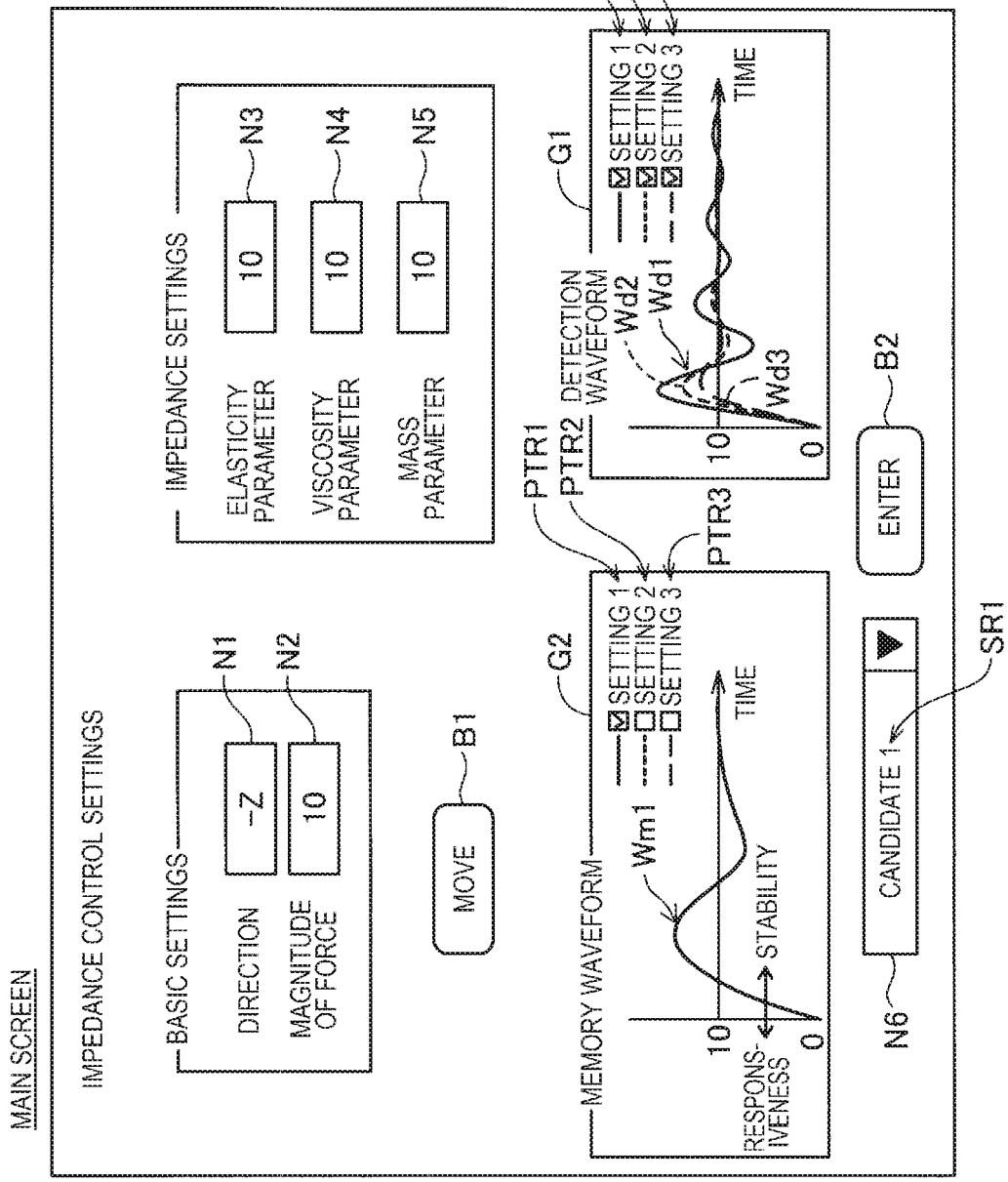
FIG. 6 shows a main screen displayed at step S510 in FIG. 5.

FIG. 6 shows the main screen displayed at step S510 in FIG. 5. The main screen contains input windows N1 to N6, a graph area G1 and a graph area G2, and a move button B1 and an enter button B2.

The input window N1 is a user interface for receiving the direction of the target force fst. The input window N2 is a user interface for receiving the magnitude of the target force fst. In the input windows N1, N2, the direction of the target force fst and the magnitude of the target force fst are respectively displayed based on the force information input at S120 in FIG. 4.

The input window N3 is a user interface for receiving the elasticity parameter k. The input window N4 is a user interface for receiving the viscosity parameter d. The input window N5 is a user interface for receiving the mass parameter m. In the input windows N3 to N5, the initial values of the mass parameter m, the viscosity parameter d, and the elasticity parameter k determined by the processing in FIG. 4 are respectively displayed. The input window N6 is a user interface for receiving selection of candidate identification information associated with the combination of the values of the force control parameters.

The graph area G1 is an area showing a time response waveform of the acting force fs operating the robot 20 based on the combination of the force control parameters input by the user and measured. The graph area G2 is an area showing a time response waveform Wd of the acting force fs associated with the combination of the force control parameters and stored in the RAM 50b of the teaching apparatus 50.

The move button B1 is a button for moving the robot 20 according to the candidate of the combination of the force control parameters input to the input windows N3 to N5 and displaying a graph of the time response waveform of the acting force fs in the graph area G1. The enter button B2 is a button for fixing the candidate of the combination of the force control parameters selected via the input window N6 as the setting values of the force control parameters.

At step S520 in FIG. 5, the teaching apparatus 50 receives the direction of the target force fst and the magnitude of the target force fst via the input windows N1, N2 of the main screen. More specifically, one direction of the six directions in the robot coordinate system RC, i.e., the X-axis direction, the Y-axis direction, the Z-axis direction, a U-axis direction (the rotation direction about the X-axis), a V-axis direction (the rotation direction about the Y-axis), and a W-axis direction (the rotation direction about the Z-axis) is input as the direction of the target force fst via the input window N1. An arbitrary numeric value indicating the magnitude of the target force fst may be input via the input window N2. The magnitude of the target force fst may take a positive value or negative value. Note that, in the embodiment, values based on the force information input at step S120 in FIG. 4 are input to the input windows N1, N2 in advance. Usually, it is not necessary for the user to change the input values of the input windows N1, N2. The user may change the values input to the input windows N1, N2 as appropriate.

At step S530, the teaching apparatus 50 receives the elasticity parameter k via the input window N3. The teaching apparatus 50 reads the initial value of the elasticity parameter k determined by the processing in FIG. 4 from the RAM 50b in advance and presents the value in the input window N3. The user inputs a value of the elasticity parameter k different from the initial value to the input window N3 as appropriate with reference to the initial value of the elasticity parameter k. According to the configuration, even a user unskilled in adjustment of the force control parameters may easily determine the setting value of the elasticity parameter.

In the first embodiment, an arbitrary numeric value may be input as the value of the elasticity parameter k. The input setting value of the elasticity parameter k is associated with the information for identification of the object operation and stored in the RAM 50b of the teaching apparatus 50.

At step S540, the teaching apparatus 50 displays one or more memory waveforms Wm corresponding to the received elasticity parameter k in the graph area G2 (see FIG. 6). The horizontal axis of the graph area G2 indicates time. The vertical axis of the graph area G2 indicates magnitude of force. The memory waveform Wm is a time response waveform of the force fs detected by the force detection unit 21 when the robot 20 is controlled based on the elasticity parameter k set via the input window N3. The memory waveform Wm is a waveform converging on the target force fst received in the input window N1.

The RAM 50b of the teaching apparatus 50 stores the memory waveforms Wm showing the time responses of the forces fs detected by the force detection unit 21 when the force control is performed according to the combinations of the value of the elasticity parameter k, the value of the viscosity parameter d, and the value of the mass parameter m in association with the combinations of those values. The respective memory waveforms Wm are further associated and stored with the candidate identification information easily understood by the user.

The memory waveform Wm may be a waveform recommended by the maker of the robot 20, in other words, a waveform of the force fs corresponding to the combination of the setting values of the force control parameters recommended by the maker of the robot 20. The memory waveform Wm may be a waveform actually measured when the robot 20 normally performs work. Or, the memory waveform Wm may be a waveform obtained by a simulation.

The teaching apparatus 50 selects a memory waveform Wm1 associated with a combination of the received elasticity parameter k and the initial value of the viscosity parameter d and the initial value of the mass parameter m determined by the processing in FIG. 4 from the plurality of memory waveforms Wm stored in advance. Then, the apparatus displays the memory waveform Wm1 and setting identification information PTR1 associated with the memory waveform Wm1 in the graph area G2. In the embodiment, for convenience of explanation, a name "setting 1" is shown as the setting identification information PTR1.

The setting identification information PTR1 is shown with a check box. The check box of the setting identification information PTR1 is checked by default. When the check box of the setting identification information PTR1 is unchecked, the memory waveform Wm1 is not displayed in the graph area G2.

The teaching apparatus 50 selects a memory waveform Wm2 associated with a combination of a value obtained by increasing the received elasticity parameter k at a predetermined rate and the initial value of the viscosity parameter d and the initial value of the mass parameter m determined by the processing in FIG. 4 from the plurality of memory waveforms Wm stored in advance. Then, the apparatus displays the memory waveform Wm2 and setting identification information PTR2 associated with the memory waveform Wm2 in the graph area G2. In the embodiment, for convenience of explanation, a name "setting 2" is shown as the setting identification information PTR2.

The setting identification information PTR2 is shown with a check box. The check box of the setting identification information PTR2 is unchecked by default. When the check box of the setting identification information PTR2 is checked, the memory waveform Wm2 is displayed in the graph area G2.

Similarly, the teaching apparatus 50 selects a memory waveform Wm3 associated with a combination of a value obtained by decreasing the received elasticity parameter k at a predetermined rate and the initial value of the viscosity parameter d and the initial value of the mass parameter m determined by the processing in FIG. 4 from the plurality of memory waveforms Wm stored in advance. Then, the apparatus displays the memory waveform Wm3 and setting identification information PTR3 associated with the memory waveform Wm3 in the graph area G2. In the embodiment, for convenience of explanation, a name "setting 3" is shown as the setting identification information PTR3.

The setting identification information PTR3 is shown with a check box. The check box of the setting identification information PTR3 is unchecked by default. When the check box of the setting identification information PTR3 is checked, the memory waveform Wm3 is displayed in the graph area G2.

In the example shown in FIG. 6, the user checks only the check box associated with the setting identification information PTR1. Accordingly, in the graph area G2 shown in FIG. 6, only the memory waveform Wm1 associated with the setting identification information PTR1 is displayed.

The change of the elasticity parameter k has a significant influence on the waveform of the force fs, more specifically, the gradient of the graph of the force fs compared to the change of the viscosity parameter d and the change of the mass parameter m. Accordingly, in the graph area G2, in addition to the memory waveform Wm1, the two memory waveforms Wm2, Wm3 corresponding to the elasticity parameters k with the values changed at the predetermined rates relative to the input elasticity parameter k are displayed according to the input by the user.

The user may view the memory waveforms Wm1 to Wm3 displayed in the graph area G2 and input the elasticity parameter k in the input window N3 all over again (see S530 in FIG. 5). In this case, the processing at steps S530, S540 is executed again.

At step S550, the teaching apparatus 50 receives the viscosity parameter d via the input window N4. Note that the teaching apparatus 50 reads the initial value of the viscosity parameter d determined by the processing in FIG. 4 from the RAM 50b in advance and presents the value in the input window N4. The user inputs a value of the viscosity parameter d different from the initial value to the input window N4 as appropriate with reference to the initial value of the viscosity parameter d. According to the configuration, even a user unskilled in the adjustment of the force control parameters may easily determine the setting value of the viscosity parameter.

In the first embodiment, an arbitrary numeric value may be input as the value of the viscosity parameter d. The input setting value of the viscosity parameter d is associated with the information for identification of the object operation and stored in the RAM 50b of the teaching apparatus 50.

At step S555, the teaching apparatus 50 receives the mass parameter m via the input window N5. Note that the teaching apparatus 50 reads the initial value of the mass parameter m determined by the processing in FIG. 4 from the RAM 50b in advance and presents the value in the input window N5. The user inputs a value of the mass parameter m different from the initial value to the input window N5 as appropriate with reference to the initial value of the mass parameter m. According to the configuration, even a user unskilled in the adjustment of the force control parameters may easily determine the setting value of the mass parameter.

In the first embodiment, an arbitrary numeric value may be input as the value of the mass parameter m. The input setting value of the mass parameter m is associated with the information for identification of the object operation and stored in the RAM 50b of the teaching apparatus 50.

At step S560, the teaching apparatus 50 determines candidates of combinations of the elasticity parameter k, the viscosity parameter d, and the mass parameter m. Specifically, the following combinations are determined as the candidates: (i) a combination of the elasticity parameter k received at step S530, the viscosity parameter d received at step S550, and the mass parameter m received at step S555; (ii) a combination of the elasticity parameter k received at step S530, a value obtained by increasing the viscosity parameter d received at step S550 at a predetermined rate, and a value obtained by increasing the mass parameter m received at step S555 at a predetermined rate; and (iii) a combination of the elasticity parameter k received at step S530, a value obtained by decreasing the viscosity parameter d received at step S550 at a predetermined rate, and a value obtained by decreasing the mass parameter m received at step S555 at a predetermined rate.

At step S570, when the move button B1 is pressed, the teaching apparatus 50 repeatedly performs the processing at steps S580, S590 according to the candidates of the combinations of the force control parameters determined at step S560. Note that the work W is placed in a position at the start of the object operation on the workbench T prior to the processing at step S580.

At step S580, the teaching apparatus 50 allows the arm A to perform a predetermined operation based on one of the candidates of the combinations of the force control parameters. That is, the teaching apparatus 50 outputs the position information representing the start position of the object operation, the force information representing the direction and the magnitude of the target force fst, and the force control parameters as the candidate values determined at step S560 to the operation control apparatus 30, and gives a command to the operation control apparatus 30 to allow the arm A to perform a predetermined operation based on those values.

In the example of FIG. 6, the arm A is controlled so that the end effector E may move in the −Z direction as a predetermined operation, the end effector E may come into contact with another object in the −Z direction, and the force fs having the magnitude set in the main screen may be detected by the force detection unit 21 (see N1, N2 in FIG. 6).

While the operation control apparatus 30 is controlling the arm A, the teaching apparatus 50 acquires the force fs after the gravity compensation measured in a predetermined sampling period from the operation control apparatus 30 (see the right lower part in FIG. 2). Then, the teaching apparatus 50 stores the acquired force fs in the RAM 50b.

At step S590, the teaching apparatus 50 displays the detection waveform based on the force fs stored in the RAM 50b with the candidate identification information corresponding to the combination candidate used for the object operation in the graph area G1. The detection waveform is a time response waveform of the acting force fs detected by the force detection unit 21. In the embodiment, the vertical axis and the horizontal axis of the graph area G1 are on the same scale as the vertical axis and the horizontal axis of the graph area G2. The detection waveform is a waveform converging on the target force fst received in the input window N1.

The processing at steps S580, S590 is executed with respect to each of the candidates of the combinations of the force control parameters, and three detection waveforms Wd1, Wd2, Wd3 are displayed with candidate identification information SR1, SR2, SR3 in the graph area G1 (see FIG. 6). In the embodiment, for convenience of explanation, names "setting 1", "setting 2", and "setting 3" are shown as the candidate identification information SR1, SR2, SR3, respectively. Note that data of the detection waveforms Wd1, Wd2, Wd3 stored within the RAM 50b are collectively shown as "detection waveform Wd" in FIG. 2.

The user checks one or more check boxes of the check boxes displayed in the graph area G1, and thereby, may display the detection waveforms associated with the checked check boxes in the graph area G1. Then, the user unchecks the check box, and thereby, may not display the detection waveform associated with the unchecked check box in the graph area G1. Note that the check boxes displayed in the graph area G1 are checked by default.

According to the processing, the user may easily visually recognize and compare how the detection waveforms change when changing the values of the force control parameters. In the example of FIG. 6, the user checks the check boxes associated with the candidate identification information SR1 to SR3. Accordingly, in the graph area G1, the detection waveforms Wd1 to Wd3 respectively associated with the candidate identification information SR1 to SR3 are displayed in the graph area G1.

At step S600 in FIG. 5, the teaching apparatus 50 receives selection of the candidate identification information from the user via the input window N6. That is, the user views the detection waveforms Wd1, Wd2, Wd3 displayed in the graph area G1, selects one of the waveforms, and inputs the candidate identification information corresponding to the selected graph to the teaching apparatus 50 via the input window N6. The input window N6 is adapted so that one piece of candidate identification information of the candidate identification information SR1 to SR3 displayed in the graph area G1 (here, "CANDIDATE 1" to "CANDIDATE 3") may be selectively input. In the example of FIG. 6, the candidate identification information SR1 is input to the input window N6.

At step S610, the teaching apparatus 50 determines whether or not the enter button B2 is turned ON. If the enter button B2 is not operated, the processing returns to step S600. If the enter button B2 is operated, the processing proceeds to step S620.

At step S620, the teaching apparatus 50 associates the combination of the force control parameters corresponding to the candidate identification information received in the input window N6 with the information for identification of the object operation together with the detection waveform associated with the candidate identification information and stores the combination in the RAM 50b. Further, the teaching apparatus 50 outputs the combination of the force control parameters corresponding to the candidate identification information received in the input window N6 together with the information for identification of the object operation to the operation control apparatus 30. The operation control apparatus 30 associates and stores the combination with the information in the RAM 30b. The setting values of the mass parameter m, the viscosity parameter d, and the elasticity parameter k stored in the RAM 50b and the RAM 30b at step S620 are shown as "setting values SV of force control parameters".

The functional unit of the teaching apparatus 50 that presents the initial values of the force control parameters to the user, receives the setting values of the force control parameters that should be used in the force control of the object operation, and stores the values in the RAM 50b and the RAM 30b as the memory units (see FIG. 5 and N3 to N5, B1, B2 in FIG. 6) is shown as "setting unit 54" in FIG. 2. After step S620, the processing ends.

After the various kinds of settings are completed, the CPU 30a of the operation control apparatus 30 performs control of the object operation of the robot 20 performed in the start position of the force control based on the setting value of the mass parameter m, the viscosity parameter d, and the elasticity parameter k stored in the RAM 30b.

In the embodiment, the values determined based on the object operation are input to the teaching apparatus 50, and thereby, the teaching apparatus 50 determines the initial values of the force control parameters in advance (see S180 in FIG. 4). Then, for determination of the setting values of the force control parameters, those initial values are presented to the user (see S530, S550, S555 in FIG. 5 and N3 to N5 in FIG. 6). Accordingly, even a user unskilled in the adjustment of the force control parameters may easily determine the setting values of the parameters that should be used in the force control.

(4) Determination of Initial Values of Force Control Parameters of Another Operation Based on Setting Values of Certain Operation:

As below, in the case where the setting values of the force control parameters have been already determined with respect to a certain operation (see FIGS. 4 and 5), processing of determining the initial values of the force control parameters of another operation in which only the position to start the operation is different will be explained. The operation for which the setting values of the force control parameters have been already determined is referred to as "first operation". The object operation for which the initial values of the force control parameters are newly determined is referred to as "second operation".

Figure 7:
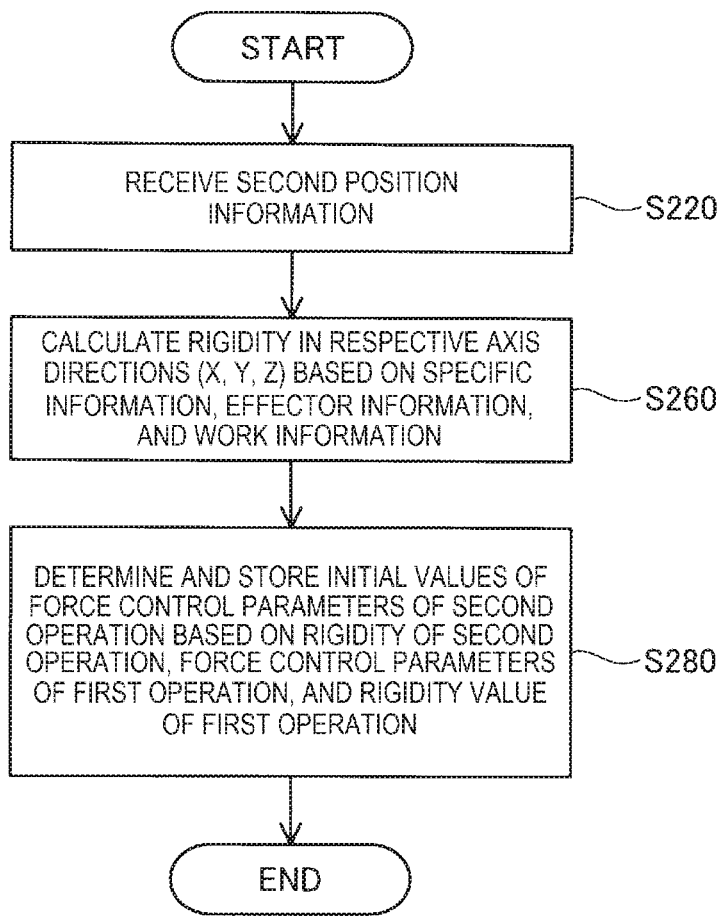
FIG. 7 is a flowchart showing processing of determining initial values of force control parameters of a second object operation based on setting values of force control parameters of a first object operation.

FIG. 7 is the flowchart showing the processing of determining the initial values of the force control parameters of the second operation based on the setting values of the force control parameters of the first operation (see S20 in FIG. 3). At step S220, the user inputs position information representing the position in which the second operation should be started to the teaching apparatus 50. Note that the posture of the end effector E when the second operation is started is the same as the posture of the end effector E when the first operation is started. The position information of the second operation is referred to as "second position information".

A direction and magnitude of the target force fst that should be applied to the work W when the second operation is executed are the same as the direction and the magnitude of the target force fst that should be applied to the work W when the first operation is executed (see S120 in FIG. 4). Further, the end effector information and the work information have been already input and stored in the RAM 50b in settings of the initial values with respect to the first operation (see S140 in FIG. 4).

At step S260, the teaching apparatus 50 acquires specific information Ic of the robot 20 from the RAM 30b of the operation control apparatus 30 (see FIG. 1). Further, the teaching apparatus 50 acquires the end effector information and the work information from the RAM 50b of the teaching apparatus 50.

At step S260, the teaching apparatus 50 obtains rigidity with respect to the X-axis, the Y-axis, and the Z-axis at the contact point between the end effector E and the work W when the TCP is located in the position represented by the second position information (see S220) based on the second position information, the end effector information, the work information, and the specific information Ic. The processing at step S260 is the same as the processing at step S160 in FIG. 4 except that the object operation is the second operation and the end effector information and the work information are acquired from the RAM 50b.

At step S280, the teaching apparatus 50 calculates rigidity of the robot 20 with respect to the direction in which the force is applied at the contact point based on the rigidity with respect to the X-axis, the Y-axis, and the Z-axis (see S260) and the force information (see S120). The obtained rigidity with respect to the direction in which the force is applied is associated with information for identification of the second operation and stored in the RAM 50b of the teaching apparatus 50. The information of the rigidity stored within the RAM 50b is shown by "rigidity Is2 of second operation" in FIG. 1.

The teaching apparatus 50 determines the initial values of the mass parameter m, the viscosity parameter d, and the elasticity parameter k of the second operation based on the following information: (i) the rigidity with respect to the direction in which the force is applied at the contact point in the second operation (see Is2 in FIG. 1); (ii) the rigidity in the first operation stored in the RAM 50b (see step S180 in FIG. 4 and Is1 in FIG. 1); and (iii) the initial values of the mass parameter m, the viscosity parameter d, and the elasticity parameter k with respect to the first operation stored in the RAM 50b (see step S180 in FIG. 5 and Iv1 in FIG. 1).

More specifically, the teaching apparatus 50 determines the initial values of the mass parameter m, the viscosity parameter d, and the elasticity parameter k with respect to the second operation based on (i) a ratio R of the rigidity in the second operation to the rigidity in the first operation and (ii) the initial values of the mass parameter m, the viscosity parameter d, and the elasticity parameter k in the first operation. The initial values of the mass parameter m, the viscosity parameter d, and the elasticity parameter k with respect to the second operation are determined as values obtained by multiplication of the respective initial values of the mass parameter m, the viscosity parameter d, and the elasticity parameter k with respect to the first operation by the ratio R.

The teaching apparatus 50 associates the initial values of the mass parameter m, the viscosity parameter d, and the elasticity parameter k with respect to the second operation with the information for identification of the second operation and stores the values in the RAM 50b of the teaching apparatus 50. The initial values of the mass parameter m, the viscosity parameter d, and the elasticity parameter k of the second operation stored within the RAM 50b are shown by "initial values IV2 of force control parameters" in FIG. 1. At steps S260, S280, the functional unit of the teaching apparatus 50 that determines the initial values of the mass parameter m, the viscosity parameter d, and the elasticity parameter k of the second operation and stores the values in the RAM 50b is "initial value determination unit 56" (FIG. 2). After step S280, the processing ends.

The determination of the setting values of the force control parameters with respect to the second operation is performed in the same manner as that of the determination of the setting values of the force control parameters with respect to the first operation (see FIG. 5).

According to the above described processing, the initial values of the force control parameters that should be used in the force control of the second operation performed in the position different from that of the first operation may be determined by the simple processing using the initial values of the first operation that have been already determined. For example, the new setting values may be determined in a shorter time when the same operation is performed in a different location and when the position of the operation is changed for layout change.

In the embodiment, the position of the TCP and the posture of the end effector E in which the first operation should be started are also referred to as "first position". The position information representing "first position" is also referred to as "first position information". The RAM 30b of the operation control apparatus 30 that stores the specific information Ic is also referred to as "memory unit". The RAM 50b of the teaching apparatus 50 that stores the initial values of the force control parameters is also referred to as "memory unit". The mass parameter m is also referred to as "mass coefficient". The viscosity parameter d is also referred to as "viscosity coefficient". The elasticity parameter k is also referred to as "elasticity coefficient".

The RAM 50b of the teaching apparatus 50 and the RAM 30b of the operation control apparatus 30 that store the setting values of the force control parameters are also referred to as "memory units". The CPU 30a of the operation control apparatus 30 is also referred to as "operation control unit". The work W is also referred to as "object". The end effector information Ie and the work information Iw are also collectively referred to as "selection information".

In the embodiment, the position of the TCP and the posture of the end effector E in which the second operation should be started are also referred to as "second position". The position information representing "second position" is also referred to as "second position information".

B. Second Embodiment

In the second embodiment, the processing of determining the setting value of the force control parameters in the teaching apparatus 50 is different from that of the first embodiment. Specifically, in the processing within steps S530, S550, S555 in FIG. 5, display in the main screen (FIG. 6) is different. The rest of the second embodiment is the same as the first embodiment.

Figure 8:
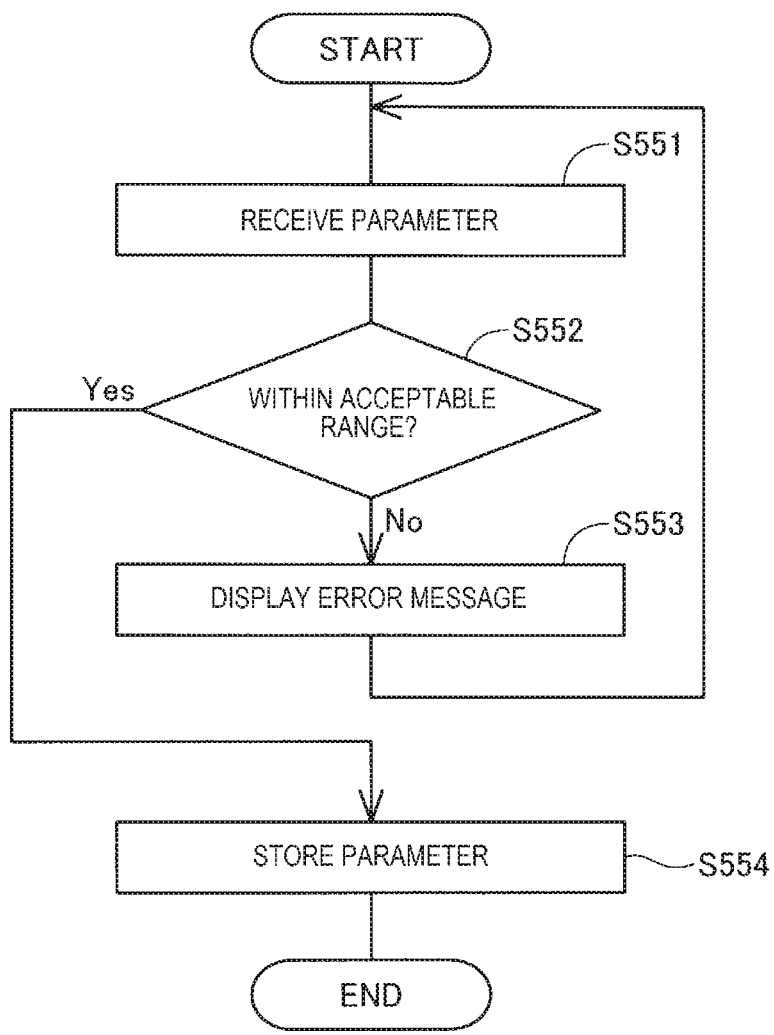
FIG. 8 is a flowchart showing detailed processing within steps S530, S550, S555 in FIG. 5.
Figure 9:
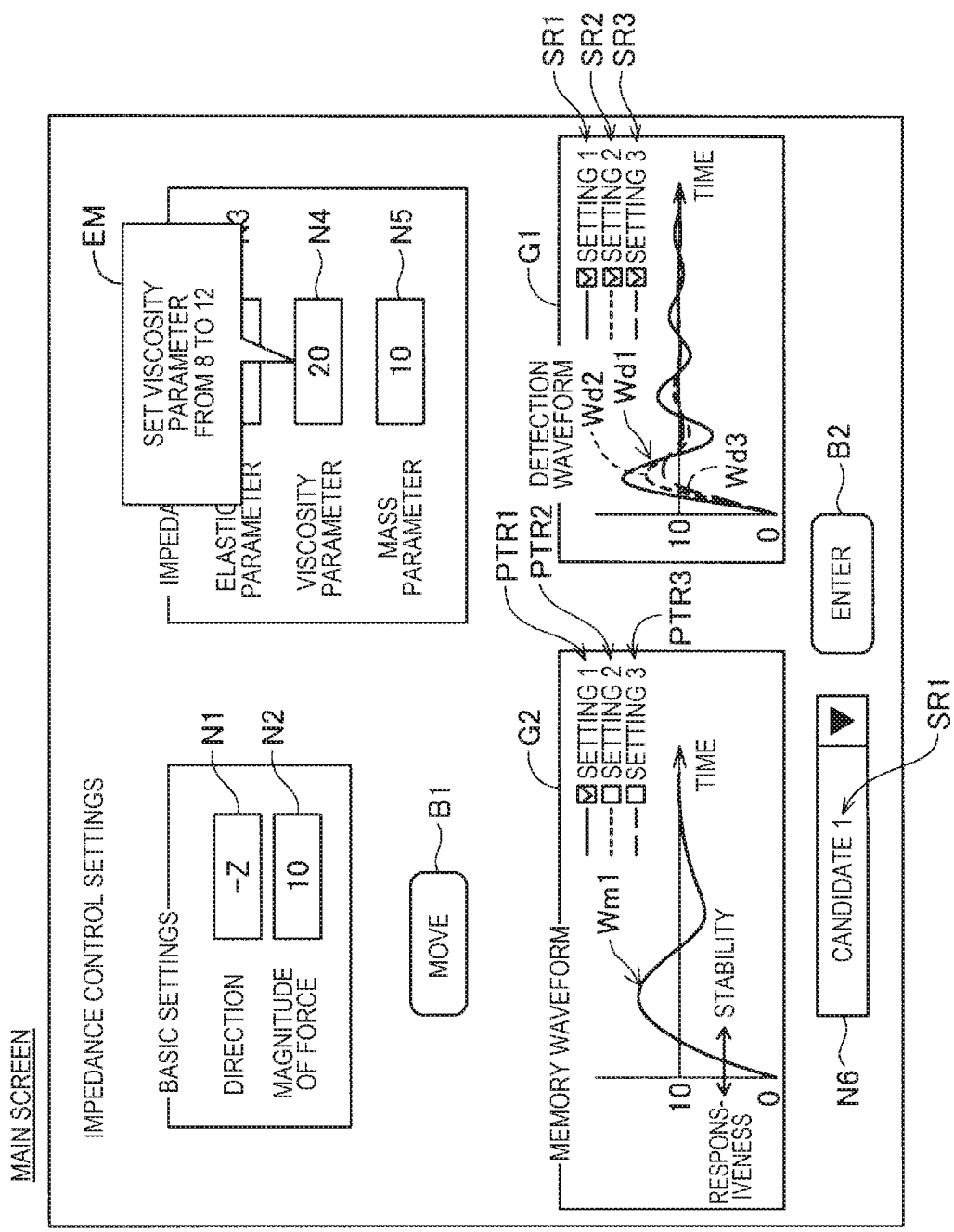
FIG. 9 shows a main screen displayed at step S553 in FIG. 8.

FIG. 8 is the flowchart showing detailed processing within steps S530, S550, S555 in FIG. 5. As below, the processing at step S550 will be explained as an example. At step S551, the user inputs the setting value of the viscosity parameter d to the input window N4 with reference to the initial value "10" displayed in the input window N4 by the teaching apparatus 50 (see FIG. 6). The teaching apparatus 50 receives the setting value of the viscosity parameter d via the input window N4. In the example of FIG. 9, the setting value "20" is input to the input window N4.

At step S552, the teaching apparatus 50 determines whether or not the received setting value of the viscosity parameter d is within a predetermined acceptable range. The acceptable range of the viscosity parameter d is a range from 0.8 to 1.2 times the initial value of the viscosity parameter d (see S180 in FIG. 4 and S280 in FIG. 7). Note that the processing at step S552 is executed regardless of whether the initial value of the viscosity parameter d is determined according to the processing in FIG. 4 or determined according to the processing in FIG. 7. If the received setting value of the viscosity parameter d is within the acceptable range, the processing proceeds to step S554. If the received setting value of the viscosity parameter d is not within the acceptable range, the processing proceeds to step S553.

At step S553, the teaching apparatus 50 displays an error message on the main screen.

FIG. 9 shows the main screen displayed at step S553 in FIG. 8. The error message EM is associated with the input window N4 to which the setting value of the viscosity parameter d is input and displayed. The error message EM is a message prompting the user to input the setting value within the acceptable range. Here, the initial value of the viscosity parameter d is "10", and the error message EM contains display of "set viscosity parameter from 8 to 12".

After step S553, the processing returns to step S551.

At step S554, the teaching apparatus 50 associates the input setting value of the viscosity parameter d with the information for identification of the object operation and stores the value in the RAM 50b of the teaching apparatus 50.

The input of the elasticity parameter k at step S530 and the input of the mass parameter at step S555 in FIG. 5 are performed in the same manner.

According to the processing, when the user is to set a value greatly different from the initial value as the setting value with respect to the force control parameters, the user may be prompted to re-enter a setting value closer to the initial value. Accordingly, even a user unskilled in the adjustment of the force control parameters may determine the setting value of the parameter that should be used in the force control as an appropriate value.

For example, in the force control, it is necessary for the end effector E to come into contact with and apply a force to the work W. However, if a beginner sets the force control parameters and the mass parameter and the viscosity parameter are too large for the desirable values, the end effector E may not come into contact with the work W within a practical time. Or, if a beginner sets the force control parameters and the mass parameter and the viscosity parameter are too small for the desirable values, the end effector E may vibrate and the vibration may not converge for a long time. On the other hand, according to the configuration of the present disclosure, the situations may be prevented.

C. Third Embodiment

Figure 10:
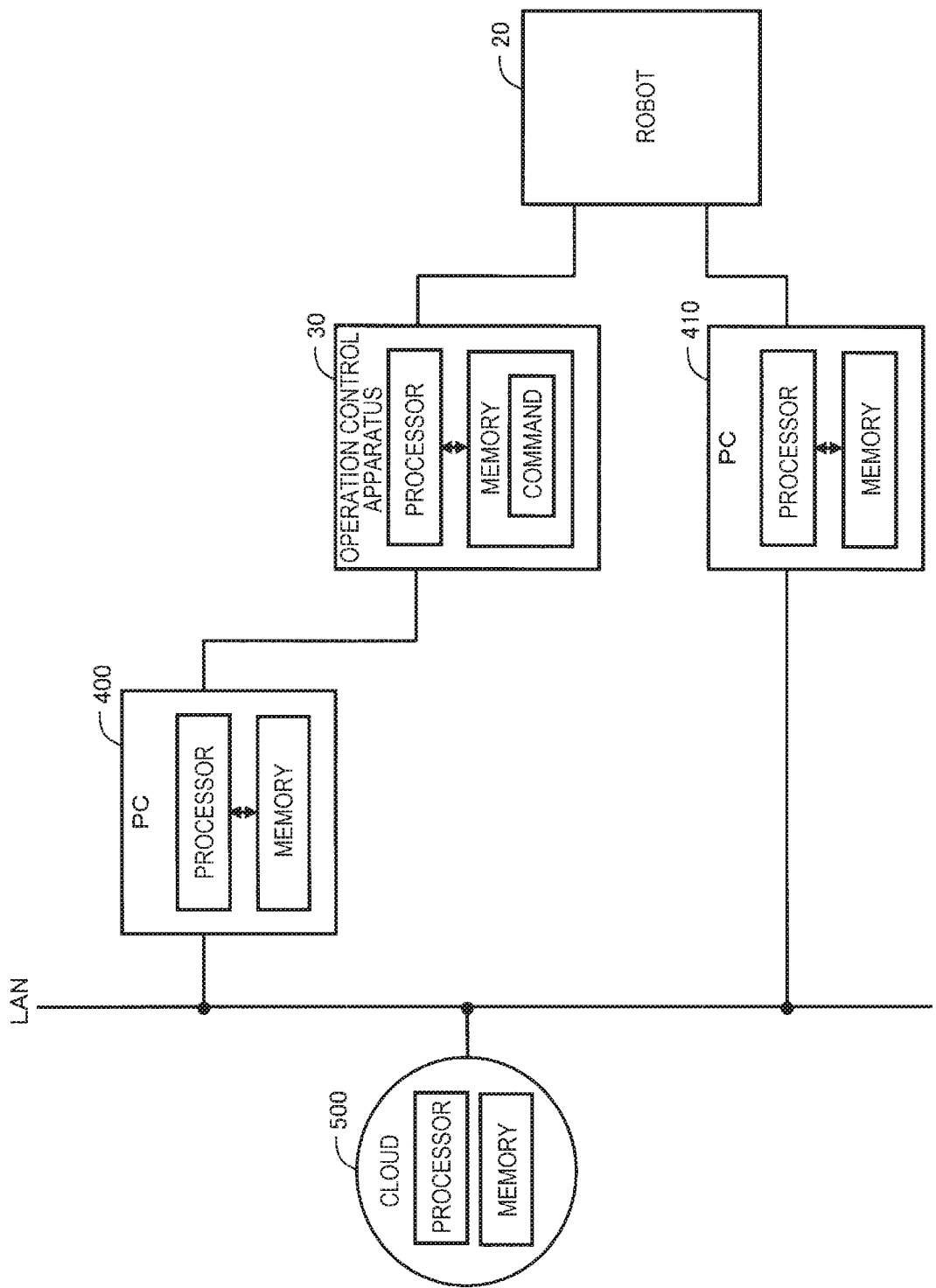
FIG. 10 is a conceptual diagram showing an example of a configuration of a control apparatus of a robot including a plurality of processors.

FIG. 10 is the conceptual diagram showing the example of the configuration of the control apparatus of the robot including the plurality of processors. In the example, in addition to the robot 20 and the operation control apparatus 30 therefor, personal computers 400, 410 and a cloud service 500 provided via a network environment such as LAN are illustrated. Each of the personal computers 400, 410 includes a processor and a memory. Further, a processor and a memory are available in the cloud service 500. The processor executes a command that can be executed by the computer. The robot control apparatus 25 including the operation control apparatus 30 and the teaching apparatus 50 can be realized using part or all of the plurality of processors. Further, the memory units storing various kinds of information can be realized using part or all of the plurality of memories.

D. Fourth Embodiment

Figure 11:
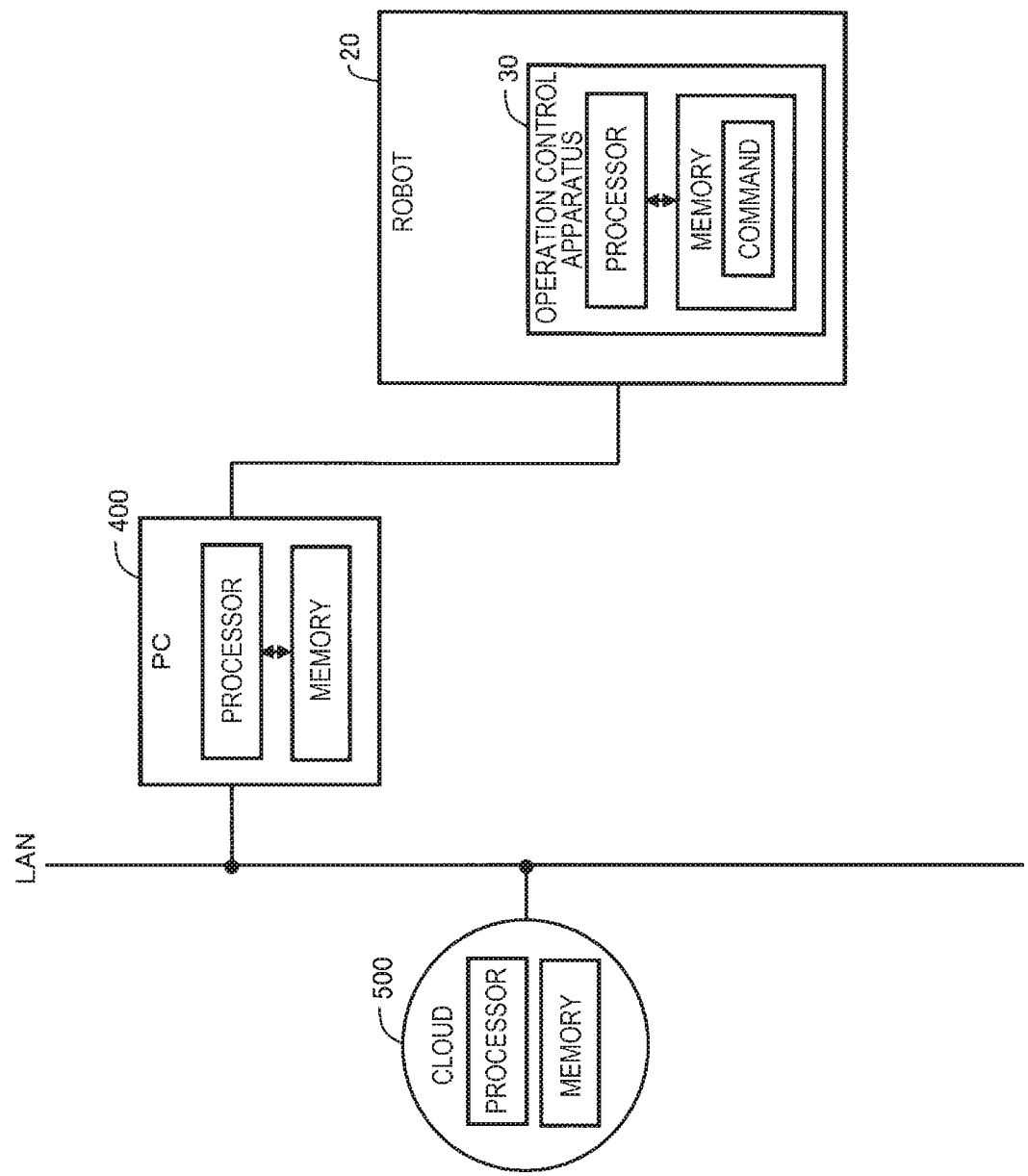
FIG. 11 is a conceptual diagram showing another example of the configuration of the control apparatus of the robot including a plurality of processors.

FIG. 11 is the conceptual diagram showing another example of the configuration of the control apparatus of the robot including a plurality of processors. The example is different from that in FIG. 10 in that the operation control apparatus 30 of the robot 20 is housed in the robot 20. Also, in this example, the control apparatus of the robot 20 can be realized using part or all of the plurality of processors. Further, the memory units storing various kinds of information can be realized using part or all of the plurality of memories.

E. Other Embodiments

E1. Other Embodiment 1

(1) In the above described embodiments, the initial value of the elasticity parameter k is the fixed value. However, the initial value of the elasticity parameter k may be determined based on the specific information of the robot and the position information of the object operation.

Further, in the above described embodiments, both of the initial values of the viscosity parameter d and the mass parameter m are determined based on the specific information of the robot and the position information of the object operation. However, only the initial value of one of the viscosity coefficient and the mass coefficient may be determined based on the specific information of the robot and the position information of the object operation, and the initial value of the other may be determined based on other elements than the specific information of the robot and the position information of the object operation. Or, the initial value of the other may be set to a fixed value.

(2) In the above described embodiments, the robot is the six-axis vertical articulated robot. However, the robot controlled by the control apparatus may be another robot such as a scalar robot or Cartesian coordinate robot. Or, the arm A may have five or less axes or seven or more axes.

(3) The target position St of the object operation may be taught to the robot system 1 by the user moving the arm A with a hand or designating coordinates via the robot control apparatus. Further, the position information representing the position of the object operation may be designated in the orthogonal coordinate system or designated by angular positions of the respective joints.

The position and the posture of the end effector E in which the object operation should be started (see S120 in FIG. 4) may be taught to the robot system 1 by the user moving the arm A with the hand or designating coordinates via the robot control apparatus. Further, the position of the TCP and the posture of the end effector E in which the object operation should be started may be designated in the orthogonal coordinate system or designated by angular positions of the respective joints.

(4) In the above described embodiments, the input of the setting values of the force control parameters is performed in the order of the elasticity parameter k, the viscosity parameter d, and the mass parameter m (see S530, S550, S555 in FIG. 5). However, in the input of the setting values of the respective force control parameters, any one of k, d, m may be input first and second. Note that the elasticity coefficient has a significant influence on the time response waveform of the acting force, and thus, it is preferable to input and determine the elasticity coefficient first of the elasticity coefficient, the viscosity coefficient, and the mass coefficient.

(5) In the above described embodiments, the setting values of the elasticity parameter k, the viscosity parameter d, and the mass parameter m are independently input (see S530, S550, S555 in FIG. 5). However, for example, the viscosity coefficient and the mass coefficient may be fixedly set, and one of the viscosity coefficient and the mass coefficient or a parameter corresponding one-to-one with one of the viscosity coefficient and the mass coefficient may be input.

(6) At step S120 of the above described embodiments, the teaching apparatus 50 is adapted so that one direction of the six directions of the X-axis direction, the Y-axis direction, the Z-axis direction, the rotation direction about the X-axis, the rotation direction about the Y-axis, and the rotation direction about the Z-axis may be selectively input as the direction of the target force fst. However, the direction of the target force fst may be specified by a combination of the force component in the X-axis direction, the force component in the Y-axis direction, the force component in the Z-axis direction, the torque component in the direction of the angular position RX, the torque component in the direction of the angular position RY, and the torque component in the direction of the angular position RZ.

(7) In the above described embodiments, the force control parameters are determined based on the rigidity of the robot 20 at the contact point between the work W and the end effector E. However, the force control parameters may be determined based on rigidity of the robot 20 at another reference point including the TCP.

(8) In the above described embodiments, the initial values and the setting values of the force control parameters are set in one set for each operation prior to the operations. However, the setting values of the force control parameters may be repeatedly set during execution of the operation. According to the configuration, the setting values of the force control parameters according to the posture of the arm may be suitably set. Note that the setting values of the force control parameters may be set in one set for each operation prior to the operations and the setting values may be consistently used during the operation.

(9) In the above described embodiments, as the force detection unit 21, the six-axis force sensor that may detect the six components of the force components in the translational three axis directions and the moment components about the rotational three axes at the same time is attached to the distal end of the arm A (see FIG. 1). However, the force detection unit may be e.g. a three-axis sensor that detects magnitude of forces on the three detection axes orthogonal to one another. In the configuration, the direction of the target force fst that may be received in the input window N1 (see FIG. 6 and S520 in FIG. 5) may be e.g. one direction of the three directions of the X-axis direction, the Y-axis direction, and the Z-axis direction in the robot coordinate system RC.

Further, the force detection unit may be provided in another part of the robot than the distal end of the arm A such as a part between the support B and the link L1. Furthermore, the function of the force detection unit may be realized by calculation of the forces in the three axis directions and the torque about the three axes at the TCP from the torque of the motors provided in the respective joints of the robot.

E2. Other Embodiment 2

In the above described embodiments, the end effector information Ie and the work information Iw are input (see S140 in FIG. 4) prior to the settings of the initial values of the force control parameters (see S160, S180 in FIG. 4 and S260, S280 in FIG. 7). However, one or both of the end effector information Ie and the work information Iw may not be input. Even in the configuration, the initial values closer to the preferable setting values may be set compared to the configuration in which initial values are fixedly set independent of the object operation.

In the above described embodiments, the end effector information includes (i) information of the weight of the end effector E and (ii) information of the relative position relationship between the position of the distal end of the arm A and the center of gravity position of the end effector E attached to the arm A. However, the end effector information may include information of rigidity of the end effector. The information of the rigidity of the end effector may be represented as rigidity with respect to the respective directions of the X-axis, the Y-axis, and the Z-axis at the contact point or TCP. Further, the information of the rigidity of the end effector may be represented as rigidity with respect to the direction of the force applied in the force control at the contact point or TCP. In the configuration, the teaching apparatus 50 obtains the rigidity with respect to the X-axis, the Y-axis, and the Z-axis of the robot at the contact point in consideration of the information of the rigidity of the end effector at S160 in FIG. 4 and S260 in FIG. 7.

In the above described embodiments, the work information includes (i) information of the weight of the work W, (ii) information of the relative position relationship between the center of gravity position of the work W when the work W is gripped by the end effector E in the object operation and the center of gravity position of the end effector E, and (iii) information of the relative position relationship between the position of the contact point of the end effector E and the work W when the work W is gripped by the end effector E in the object operation and the center of gravity position of the end effector E.

However, the work information may include information of the rigidity of the work as the object. The information of rigidity of the object may be represented as rigidity with respect to the respective directions of the X-axis, the Y-axis, and the Z-axis at the contact point or TCP. Further, the information of the rigidity of the object may be represented as rigidity with respect to the direction of the force applied in the force control at the contact point or TCP. In the configuration, the teaching apparatus 50 obtains the rigidity with respect to the X-axis, the Y-axis, and the Z-axis of the robot at the contact point in consideration of the information of the rigidity of the work at S160 in FIG. 4 and S260 in FIG. 7.

Or, prior to the settings of the initial values of the force control parameters, as one configuration of the selection information, rigidity in the Z-axis direction of the workbench T on which the work W is placed may be input and the initial values of the force control parameters may be set based on the information. Or, when the work is attached to a predetermined jig, rigidity of the jig in the X direction, the Y direction and the Z-axis direction may be input and the initial values of the force control parameters may be set based on the information of the rigidity.

Or, prior to the setting of the initial values of the force control parameters, as one configuration of the selection information, information representing materials of the workbench may be input in place of the information of the numeric value representing the rigidity of the workbench. In the configuration, with reference to the information of the rigidity associated with the materials, rigidity in the direction in which the force is applied in the force control and further the force control parameters may be obtained.

That is, the robot control apparatus may receive selection information on the configurations of one or more of the end effector attached to the robot in the operation including the force control, the object to be processed by the robot in the operation including the force control, and a bench on which the object is placed in the operation including the force control.

E3. Other Embodiment 3

(1) In the above described embodiments, the initial values Iv1 of the force control parameters of the first operation are associated with the information for identification of the first operation as the object operation and stored in the RAM 50*b* of the teaching apparatus 50 (see S180 in FIG. 4). Further, in the RAM 50*b* of the teaching apparatus 50, the position information of the first operation as the object operation is also associated with the information for identification of the first operation and stored. That is, the initial values Iv1 of the force control parameters of the first operation are associated with the position information of the first operation via the information for identification of the first operation and stored in the memory unit.

However, the initial values of the force control parameters of the first operation may be stored in another configuration. For example, the initial values of the force control parameters of the first operation may be directly associated with the position information of the first operation and stored. That is, the initial values of the force control parameters of the first operation may be directly or indirectly associated with the position information representing the position and the posture in which the object operation should be started and stored in the memory unit.

(2) In the above described embodiments, the second operation is different from the first operation in that only the position in which the operation should be started is different. The second operation may be an operation in which the position within the three-dimensional space is different, but the posture of the end effector is the same, an operation in which the position within the three-dimensional space is the same, but the posture of the end effector is different, or an operation in which the position within the three-dimensional space and the posture of the end effector are respectively the same compared to the first operation.

(3) In the above described embodiments, the initial values of the force control parameters of the second operation are determined as values obtained by multiplication of the initial values of the force control parameters with respect to the first operation (see S180 in FIG. 4) by the ratio R of the rigidity in the second operation to the rigidity in the first operation (see S280 in FIG. 7). However, the force control parameters of the second operation may be further corrected using parameters derived from other elements. Or, the rigidity ratio R may be corrected using parameters derived from other elements. Or, the force control parameters of the second operation may be determined by another method.

For example, the initial values of the force control parameters of the second operation may be determined as values obtained by multiplication of the setting values (see S620 in FIG. 5) in place of the initial values of the force control parameters with respect to the first operation by the ratio R of the rigidity in the second operation to the rigidity in the first operation (see S280 in FIG. 7). According to the configuration, the initial values of the second operation are determined based on the setting values of the first operation determined by the user actually moving the robot. Accordingly, it is highly likely to set more preferable initial values. Also, in the configuration, the initial values obtained by multiplication by the rigidity ratio R or the rigidity ratio R itself may be corrected using various parameters.

Regarding part of the force control parameters, i.e., one or two parameters of the mass parameter, the viscosity parameter, and the elasticity parameter, the values with respect to the first operation may be applied to the second operation without alteration using the rigidity ratio R. Or, correction derived from other elements may be made to part of the force control parameters altered using the rigidity ratio R and correction derived from other elements may not be made to the other part of the force control parameters altered using the rigidity ratio R.

Or, in another configuration without using the rigidity ratio R, the initial values of the force control parameters of the second operation may be determined based on the initial values or setting values of the force control parameters of the first operation using the rigidity in the first operation and the rigidity in the second operation.

E4. Other Embodiment 4

(1) In the above described embodiments, the acceptable range of the viscosity parameter d is the range from 0.8 to 1.2 times the initial value of the viscosity parameter d (see S552 in FIG. 8). However, the lower limit of the acceptable range of the force control parameter may be set to another value such as 0.9 times the initial value or 0.7 times the initial value. Further, the upper limit of the acceptable range of the force control parameter may be set to another value such as 1.1 times the initial value or 1.3 times the initial value.

The acceptable ranges of the force control parameters are not limited to those determined by ratios to the initial values, but lower limits obtained by subtraction of fixed values from the initial values or upper limits obtained by addition of fixed values to the initial values may be set.

Further, the acceptable ranges of the force control parameters may be independently set with respect to the elasticity coefficient, the viscosity coefficient, and the mass coefficient. On the other hand, coefficients by which the initial values are multiplied may be the same with respect to the elasticity coefficient, the viscosity coefficient, and the mass coefficient.

(2) In the above described embodiments, when the input setting value is beyond the acceptable range, the error message EM is displayed and re-enter of the setting value is prompted (see FIG. 9). However, the robot control apparatus may forcibly change the input setting value to a value within the acceptable range, and issue a message prompting re-entry of the setting value or a message that the setting value has been changed to the user. Or, not the image display (see EM in FIG. 9), but sound may be output. Or, whether or not the robot control apparatus changes the input value may be selected by the user via checking in a check box.

The robot control apparatus may individually have predetermined acceptable ranges based on the respective initial values with respect to the respective force control parameters and change the input values to values within the acceptable ranges. On the other hand, the apparatus may set acceptable ranges with respect to the respective force control parameters based on the rigidity with respect to the direction in which the force is applied. For example, when the rigidity is higher, it is preferable to set values or acceptable ranges of the respective force control parameters (e.g. the mass parameter and the viscosity parameter) to be larger. According to the configuration, the values of the respective force control parameters may be set so that the end effector may be harder to vibrate. Note that, when the rigidity is higher, the values or acceptable ranges of the respective force control parameters (e.g. the mass parameter and the viscosity parameter) may be set to be smaller.

(3) When the input setting value is beyond the acceptable range, the input setting value may not be stored in the memory unit referred to by the operation control unit that controls the operation of the robot when controlling the robot. Or, when the input setting value is beyond the acceptable range, the input setting value may be stored in the memory unit referred to by the operation control unit when controlling the robot.

(4) The memory units that store various kinds of information may be memory unit existing in the same housing or memory unit respectively provided inside of a plurality of component elements communicably connected with one another.

F. Yet Other Embodiments

Application Example 1

According to one embodiment of the present disclosure, a robot control apparatus that controls an operation of a robot including a force detection unit detecting magnitude of an externally applied force is provided. The robot control apparatus includes: a receiving unit that receives first position information representing a first position in which a first operation including force control to be performed based on the magnitude of the force detected by the force detection unit is to be started; and an initial value determination unit that determines an initial value of one of a mass coefficient and a viscosity coefficient to be used in the force control of the first operation based on specific information on a configuration of the robot and the first position information and allows a memory unit to store the value.

According to the configuration, even a user unskilled in adjustment of force control parameters may easily determine at least one setting value of the mass coefficient and the viscosity coefficient that should be used in the force control using the initial value.

Note that the robot control apparatus of the above described embodiment may further includes: a setting unit that presents the initial value to a user, receives the at least one setting value that should be used in the force control of the first operation, and allows the memory unit to store the value; and an operation control unit that allows the robot to perform the first operation based on the setting value.

Application Example 2

In the robot control apparatus of the above described embodiment, the receiving unit may receive selection information on one or more configurations of an end effector attached to the robot, an object to be processed by the robot, and a bench on which the object is placed, and the initial value determination unit may determine the initial value based on the selection information.

According to the configuration, the initial value closer to a desirable setting value may be determined using the selection information on one or more configurations of the end effector, the object, and the bench. Accordingly, even a user unskilled in adjustment of the force control parameters may more easily determine at least the setting value of one of the mass coefficient and the viscosity coefficient that should be used in the force control.

Application Example 3

In the robot control apparatus of the above described embodiment, the initial value determination unit may associate the initial value with the first position information and allows the memory unit to store the value, the receiving unit may receive second position information representing a second position as a position different from the first position in which a second operation including the force control is to be started, and the initial value determination unit may determine an initial value of one of the coefficients to be used in the force control of the second operation based on the initial value associated with the first position information, the first position information, and the second position information, and associate the initial value with the second position information and allows the memory unit to store the value.

According to the configuration, at least the initial value of one of the mass coefficient and the viscosity coefficient that should be used in the force control of the second operation to be performed in the second position different from the first position may be determined by simple processing using the initial value associated with the first position information that has been already determined.

Note that the setting unit may present the at least one initial value that should be used in the force control of the second operation to the user, receive the at least one setting value that should be used in the force control of the second operation, and allows the memory unit to store the value, and the operation control unit may allow the robot to perform the second operation based on the at least one setting value that should be used in the force control of the second operation.

Application Example 4

The robot control apparatus of the above described embodiment may further include a setting unit that receives the setting value of the one coefficient that should be used in the force control of the second operation and allows the memory unit to store the value, and the setting unit may output an error message when the received setting value is not within a range predetermined based on the initial value of the one coefficient to be used in the force control of the second operation.

According to the configuration, when the user is to set a value greatly different from the initial value as the setting value with respect to at least one of the mass coefficient and the viscosity coefficient, the user may be prompted to re-enter a setting value closer to the initial value. Accordingly, even a user unskilled in the adjustment of the force control parameters may determine the setting value of at least one of the mass coefficient and the viscosity coefficient that should be used in the force control as an appropriate value.

Application Example 5

The robot control apparatus of the above described embodiment may further include a setting unit that receives the setting value of the one coefficient that should be used in the force control of the first operation, and allows the memory unit to store the value, and the setting unit may output an error message when the received setting value is not within a range predetermined based on the initial value.

According to the configuration, when the user is to set a value greatly different from the initial value as the setting value with respect to at least one of the mass coefficient and the viscosity coefficient, the user may be prompted to re-enter a setting value closer to the initial value. Accordingly, even a user unskilled in the adjustment of the force control parameters may determine the setting value of at least one of the mass coefficient and the viscosity coefficient that should be used in the force control as an appropriate value.

Application Example 6

According to another embodiment of the present disclosure, a robot system including the robot control apparatus of the above described embodiment and the robot controlled by the robot control apparatus is provided.

Not all of the plurality of component elements of the above described respective embodiments of the present disclosure are essential. To solve part or all of the above described problems or to achieve part or all of the advantages described in this specification, changes, deletion, replacement by new other component elements, and partial deletion of limitations can be appropriately made to partial component elements of the plurality of component elements. Further, to solve part or all of the above described problems or to achieve part or all of the advantages described in this specification, part or all of the technical features contained in the above described one embodiment of the present disclosure can be combined with part or all of the technical features contained in the above described other embodiment of the present disclosure and one independent embodiment of the present disclosure can be formed.

What is claimed is:

1. A robot control apparatus comprising:
a processor that is configured to control an operation of a robot including a force detector detecting magnitude of an externally applied force,
wherein the processor is configured to:
receive first position information representing a first position in which a first operation including force control to be performed based on the magnitude of the force detected by the force detector is to be started;
determine an initial value of one of a mass coefficient and a viscosity coefficient to be used in the force control of the first operation based on specific information on a configuration of the robot and the first position information; and
store the initial value in a memory.

2. The robot control apparatus according to claim 1, wherein
the processor is configured to receive selection information on one or more configurations of:
an end effector attached to the robot;
an object to be processed by the robot; and
a bench on which the object is placed, and
determine the initial value based on the selection information.

3. The robot control apparatus according to claim 1, wherein
the processor is configured to:
store the initial value associated with the first position information in the memory;
receive second position information representing a second position as a position different from the first position in which a second operation including the force control is to be started;
determine an initial value of one of the coefficients to be used in the force control of the second operation based on the initial value associated with the first position information, the first position information, and the second position information, and associates the initial value with the second position information; and
store the initial value associated with the second position information in the memory.

4. The robot control apparatus according to claim 3, wherein the processor is configured to:
receive the setting value of the one coefficient to be used in the force control of the second operation;
store the setting value in the memory; and
output an error message when the received setting value is not included within a range predetermined based on the initial value of the one coefficient to be used in the force control of the second operation.

5. The robot control apparatus according to claim 1, wherein the processor is configured to:
receive the setting value of the one coefficient to be used in the force control of the first operation;
store the setting value in the memory; and
output an error message when the received setting value is not within a range predetermined based on the initial value.

6. A robot system comprising:
a robot;
a force detector provided to the robot; and
a robot control apparatus including a processor that is configured to control an operation of the robot,
wherein the processor is configured to:
receive first position information representing a first position in which a first operation including force control to be performed based on magnitude of the force detected by the force detector is to be started;
determine an initial value of one of a mass coefficient and a viscosity coefficient to be used in the force control of the first operation based on specific information on a configuration of the robot and the first position information; and
store the initial value in a memory.

* * * * *